(12) United States Patent
Hu et al.

(10) Patent No.: US 11,555,827 B2
(45) Date of Patent: Jan. 17, 2023

(54) TORSION WING PROBE ASSEMBLY

(71) Applicant: Bruker Nano, Inc., Santa Barbara, CA (US)

(72) Inventors: Shuiqing Hu, Santa Barbara, CA (US); Martin Wagner, Goleta, CA (US); Weijie Wang, Thousand Oaks, CA (US); Chanmin Su, Ventura, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 17/473,577

(22) Filed: Sep. 13, 2021

(65) Prior Publication Data

US 2022/0107339 A1  Apr. 7, 2022

Related U.S. Application Data

(62) Division of application No. 16/866,168, filed on May 4, 2020, now Pat. No. 11,119,118.

(60) Provisional application No. 62/842,973, filed on May 3, 2019.

(51) Int. Cl.
  *G01Q 20/02* (2010.01)
  *G01Q 60/38* (2010.01)

(52) U.S. Cl.
  CPC ............. *G01Q 20/02* (2013.01); *G01Q 60/38* (2013.01)

(58) Field of Classification Search
  CPC ............................... G01Q 60/38; G01Q 20/02
  USPC ......................................... 850/5, 6, 7, 56, 60
  See application file for complete search history.

(56) References Cited

U.S. PATENT DOCUMENTS

| 6,100,524 A * | 8/2000 | Yagi | G01Q 60/38 250/442.11 |
|---|---|---|---|
| 2008/0128385 A1* | 6/2008 | Beyder | G01Q 10/045 216/24 |
| 2008/0257022 A1 | 10/2008 | Sachs | |
| 2010/0014142 A1* | 1/2010 | Akedo | B81B 3/0072 359/224.1 |

FOREIGN PATENT DOCUMENTS

| EP | 1985991 | 10/2008 |
|---|---|---|
| KR | 10-2009-0130537 | 12/2009 |

* cited by examiner

*Primary Examiner* — Nicole M Ippolito
(74) *Attorney, Agent, or Firm* — Boyle Fredrickson S.C.

(57) ABSTRACT

A torsional probe for a metrology instrument includes a cantilever coupled to a support structure via a torsion bar. The cantilever, support structure, and arms of torsion bar have substantially the same thickness. A method of manufacture of the torsion probe, as well as a method of using the torsion probe to measure photothermal induced surface displacement of a sample are also described.

10 Claims, 13 Drawing Sheets

TORSION WING PROBE ASSEMBLY

CROSS-REFERENCE TO RELATED APPLICATIONS

This application is a divisional of U.S. Non-Provisional patent application Ser. No. 16/866,168, filed May 4, 2020 (and issued as U.S. Pat. No. 11,119,118 on Sep. 14, 2021), which claims priority under 35 USC § 1.119(e) to U.S. Provisional Patent Application No. 62/842,973, filed May 3, 2019. The subject matter of these applications are hereby incorporated by reference in their entirety.

BACKGROUND OF THE INVENTION

Field of the Invention

The preferred embodiments are directed to a probe device for a metrology instrument and a corresponding method of manufacture, and more particularly, a torsion wing probe for use in, e.g., an atomic force microscope (AFM), that achieves greatly improved imaging bandwidth and can be readily batch fabricated.

Description of Related Art

Scanning probe microscopes (SPMs), such as the atomic force microscope (AFM), are devices which use a sharp tip and low forces to characterize the surface of a sample down to atomic dimensions. Generally, the tip of the SPM probe is introduced to the sample surface to detect changes in the characteristics of the sample. By providing relative scanning movement between the tip and the sample, surface characteristic data can be acquired over a particular region of the sample and a corresponding map of the sample can be generated.

An overview of AFM and its operation follows. A typical AFM system is shown schematically in FIG. 1. An AFM 10 employing a probe device 12 including a probe 14 having a cantilever 15. Scanner 24 generates relative motion between the probe 14 and sample 22 while the probe-sample interaction is measured. In this way images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes, for example, a piezoelectric tube actuator. Alternatively, the scanner may be an assembly of multiple separate actuators. Some AFMs separate the scanner into multiple components, for example an XY scanner that moves the sample and a separate Z-actuator that moves the probe. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

Figure 1:
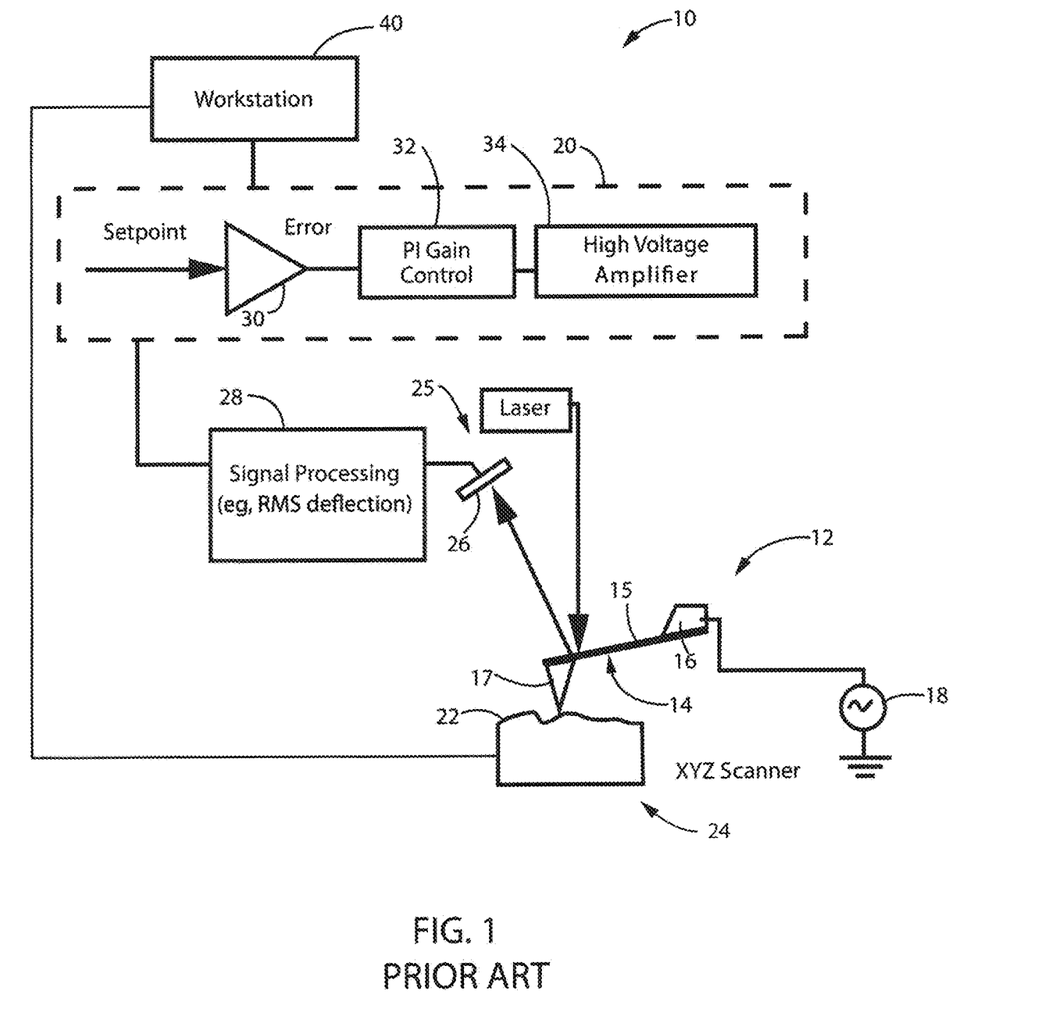
FIG. 1 is a schematic illustration of a Prior Art atomic force microscope.

In a common configuration, probe 14 is often coupled to an oscillating actuator or drive 16 that is used to drive probe 14 at or near a resonant frequency of cantilever 15. Alternative arrangements measure the deflection, torsion, or other motion of cantilever 15. Probe 14 is often a microfabricated cantilever with an integrated tip 17.

Commonly, an electronic signal is applied from an AC signal source 18 under control of an SPM controller 20 to cause actuator 16 (or alternatively scanner 24) to drive the probe 14 to oscillate. The probe-sample interaction is typically controlled via feedback by controller 20. Notably, the actuator 16 may be coupled to the scanner 24 and probe 14 but may be formed integrally with the cantilever 15 of probe 14 as part of a self-actuated cantilever/probe.

A selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26. As the beam translates across detector 26, appropriate signals are processed at block 28 to, for example, determine RMS deflection and transmit the same to controller 20, which processes the signals to determine changes in the oscillation of probe 14. In general, controller 20 generates control signals to maintain a relative constant interaction between the tip and sample (or deflection of the lever 15), typically to maintain a setpoint characteristic of the oscillation of probe 14. More particularly, controller 20 may include a PI Gain Control block 32 and a High Voltage Amplifier 34 that condition an error signal obtained by comparing, with circuit 30, a signal corresponding to probe deflection caused by tip-sample interaction with a setpoint. For example, controller 20 is often used to maintain the oscillation amplitude at a setpoint value, AS, to insure a generally constant force between the tip and sample. Alternatively, a setpoint phase or frequency may be used.

A workstation 40 is also provided, in the controller 20 and/or in a separate controller or system of connected or stand-alone controllers, that receives the collected data from the controller and manipulates the data obtained during scanning to perform point selection, curve fitting, and distance determining operations.

The deflection of the cantilever in response to the probe tip's (most AFMs employ sharp tipped probes (radius less than 10 nm) for high resolution) interaction with the sample is measured with an extremely sensitive deflection detector, most often an optical lever system. In such optical systems, a lens is employed to focus a laser beam, from a source typically placed overhead of the cantilever, onto the back side of the cantilever. The backside of the lever (the side opposite the tip) is reflective (for example, using metallization during fabrication) so that the beam may be reflected therefrom towards a photodetector. The translation of the beam across the detector during operation provides a measure of the deflection of the lever, which again is indicative of one or more sample characteristics.

Figure 2A:
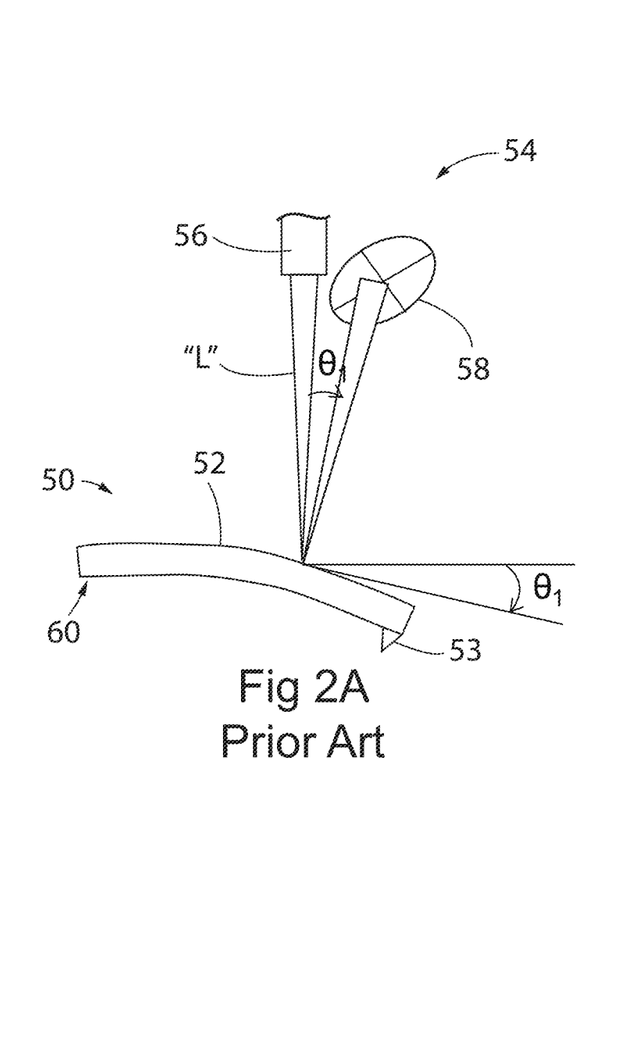
FIGS. 2A and 2B are schematic side elevational views of a prior art AFM, including a probe and a deflection detection apparatus, illustrating an issue with detecting deflection when the light beam hits different spots on the backside of the cantilever.
Figure 2B:
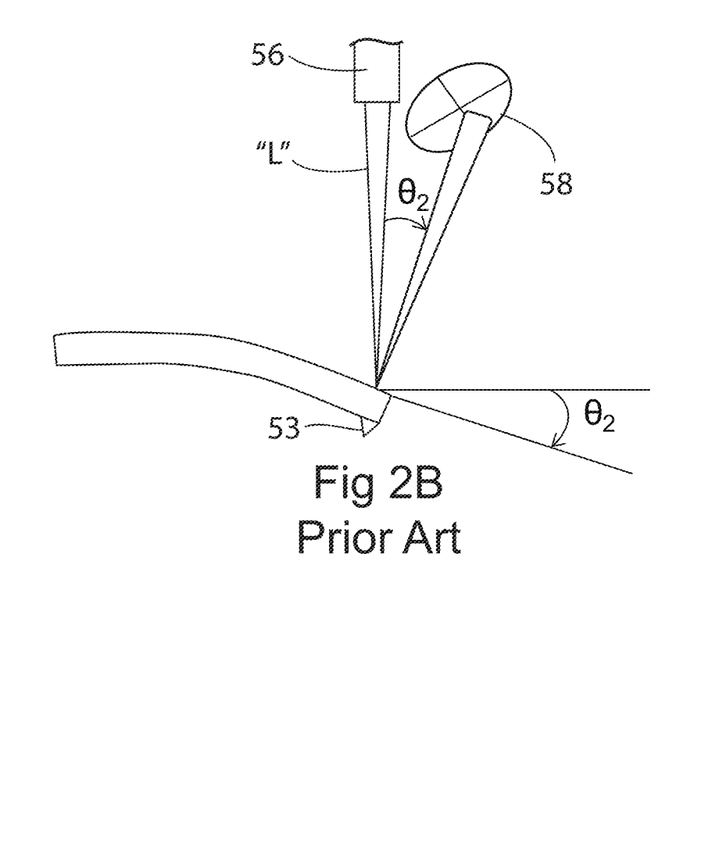

In a standard probe having a "diving board" or triangular shape, the point at which the focused laser beam contacts the backside of the cantilever determines the rotation angle, which influences the photodiode deflection signal and deflection sensitivity. As shown schematically in FIGS. 2A and 2B, an AFM probe 50 having a reflective backside 52 typically is driven to oscillate at its resonant frequency as its tip 53 is introduced to the sample (not shown). To measure the deflection of probe 50 during this interaction, an optical deflection detection system 54 such as that described previously is employed. Deflection detection system 54 includes a laser 56 that directs a beam of electromagnetic energy "L" towards backside 52 of probe 50. This beam "L" is reflected back towards a detector such as a quadrant photodiode 58. In FIG. 2A, when the laser beam "L" is positioned to strike backside 52 more toward a fixed end 60 (about the middle) of probe 50, the rotation angle is $\theta_1$. However, if the beam "L" is positioned to direct the beam "L" towards the free or tip end of probe 50, the rotation angle is $\theta_2$, a larger angle even though probe deflection is the same. As shown, in this latter case, the beam contacts detector 58 more towards its edge, rather than its center. This difference can greatly impact sensitivity, which ideally would be constant, i.e., independent of laser position. Notably, with a typical diving board or triangular shaped cantilever, sensitivity changes with laser alignment position, making constant sensitivity essentially impossible.

Figure 3:
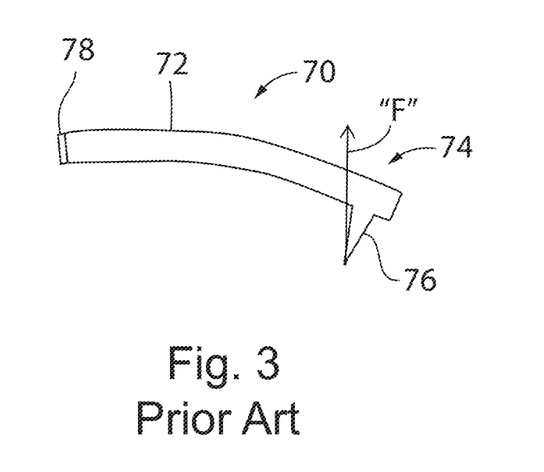
FIG. 3 is a schematic side elevational view of a Prior Art diving board type probe, having a fixed end.

Another drawback of a standard diving board or triangular shaped lever with a fixed end is that the force on the tip can influence the measurement. For example, measuring a sample's response to IR excitation in Peak Force Tapping mode (PFT-IR), the contact resonance frequency will change with the contact force. FIG. 3 shows a probe 70 including a cantilever 72 having a free end 74 supporting a tip 76. Lever 72 extends from a probe base (not shown) at a fixed end 78. This boundary condition causes the contact resonance frequency to be dependent on contact force "F" between tip 76 and sample (not shown) in a generally orthogonal (Z) direction to the sample surface. This complicates the sample property measurement as contact resonance needs to be tracked due to frequency shift. It was desired to have an AFM probe in which the measured contact resonance frequency be substantially independent of the contact force between the tip and sample.

In view of the above, the metrology field was in need of a probe that overcomes the above-noted drawbacks related to laser positioning in, e.g., the AFM optical deflection detection scheme, and the effects of tip-sample interaction forces on the AFM measurement, including monitoring contact resonance frequency when measuring sample characteristics in PF-IR mode.

Note that "SPM" and the acronyms for the specific types of SPM's, may be used herein to refer to either the microscope apparatus, or the associated technique, e.g., "atomic force microscopy."

SUMMARY OF THE INVENTION

According to a preferred embodiment, a torsion wing probe microfabricated by a process includes the steps of providing a substrate and depositing layers of silicon oxide and silicon nitride on the substrate. Then, a base of the probe assembly is photolithographically formed on a first side of the substrate. Another layer of silicon nitride is deposited on the first side, and then the probe of the probe assembly photolithographically formed to include a support structure, a cantilever having opposed ends, a first free end supporting a tip, and a second free end. Further, a pair of torsion arms coupling the cantilever to the support structure are formed. The support structure, the cantilever and the torsion bars have equal thicknesses.

In another aspect of this embodiment, the cantilever includes first and second portions on opposites sides of the torsion arms, and the surface area of the first portion is substantially equal to the surface area of the second portion.

According to a further aspect of this embodiment, the thickness is less than 5 µm and a stiffness of the support structure is at least ten times greater than the stiffness of the torsion arms.

In a yet another aspect of this embodiment, the cantilever includes first and second portions on opposites sides of the torsion arms, wherein the surface area of the first portion is substantially equal to the surface area of the second portion.

According to another embodiment, a method of batch-fabricating torsion wing probes for a surface analysis instrument includes providing a substrate, and depositing an oxide layer on the substrate. Then a silicon nitride layer is deposited on the oxide layer, and the silicon nitride, silicon oxide and substrate are backside etched to form the base. The method then includes frontside etching the silicon nitride, the silicon oxide and the substrate to form tips of the probes. Thereafter, a second silicon nitride layer on the substrate is deposited, and a second silicon nitride layer is patterned to form a support structure, a cantilever and torsion arms that couple the support structure and the cantilever for each of the probes. The support structure, the cantilever and the torsion arms have substantially the same thickness.

In a further aspect of this embodiment, a ratio of natural resonance frequency to spring constant ($f_0$/k) of the probe is at least three (3) times greater than the $f_0$/k of a diving board cantilever having one end fixed to a diving board base, a resonant frequency of about 138 kHz, and a spring constant, k, of about 0.3 N/m.

In a still further embodiment, a method of operating an AFM to measure photothermal induced surface displacement of a sample includes the steps of providing a torsion wing probe having a support structure, a cantilever supporting a tip and a torsion bar including torsion arms coupling the cantilever to the support structure, and driving the probe in to oscillation in an AFM mode of operation. The method then directs IR radiation toward a surface of the sample at about a location of the tip causing displacement of the surface and driving the torsion bar in to resonance, and measures the displacement based on deflection of the probe in response to the directing step.

According to another aspect of this embodiment, the AFM mode is PFT mode.

In another aspect of this embodiment, the cantilever includes first and second portions on opposites sides of the torsion arms, wherein the surface area of the first portion is substantially equal to the surface area of the second portion, and wherein a resonant frequency of the torsion wing probe is between about 300-500 kHz, and the spring constant, k, is between about 0.1 and 0.5 N/m.

According to a further aspect of this embodiment, the torsion wing probe has a homogeneous thickness. Moreover, the IR radiation is mid-IR radiation.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

Figure 4:
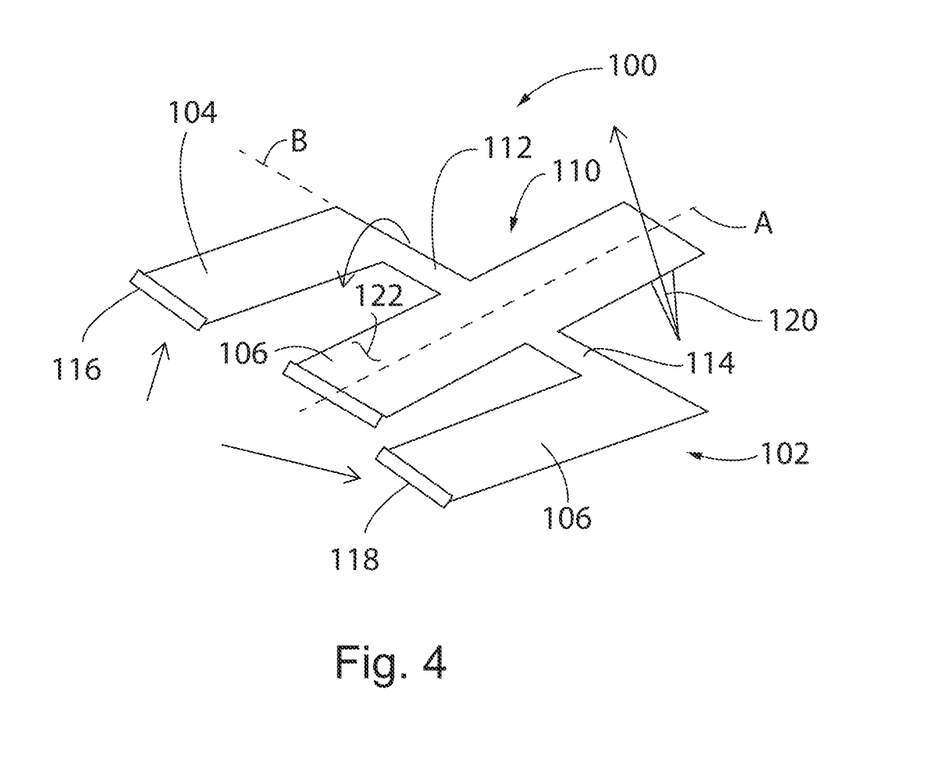
FIG. 4 is a schematic isometric view of a torsion wing probe according to a preferred embodiment of the present invention.

Referring initially to FIG. 4, a torsional (or torsion wing) probe 100 for use in an atomic force microscope is shown schematically including a support structure 102, having support members 104, 106 separated by an opening 108 that accommodates at least a portion of a cantilever 110. Cantilever 110 is coupled to members 104, 106 via torsion bars 112, 114 substantially orthogonal to the longitudinal axis "A" of lever 110, at about its midpoint.

In operation, as probe 100 is driven in to oscillation, torsion bars 112, 114 rotate allowing the entire cantilever 110 to freely rotate about axis "B", with support members 104, 106 having fixed ends 116, 118, respectively. As a result, as a tip of probe 110 interacts with the sample (not shown) the contact force will have a much lower influence on, for example, the contact resonance frequency in PF-IR mode, as desired. This is in direct contrast to a standard AFM probe, such as probe 70 shown in FIG. 3, in which the contact resonance frequency is dependent on the contact force given fixed boundary 78 of lever 72.

Figure 5A:
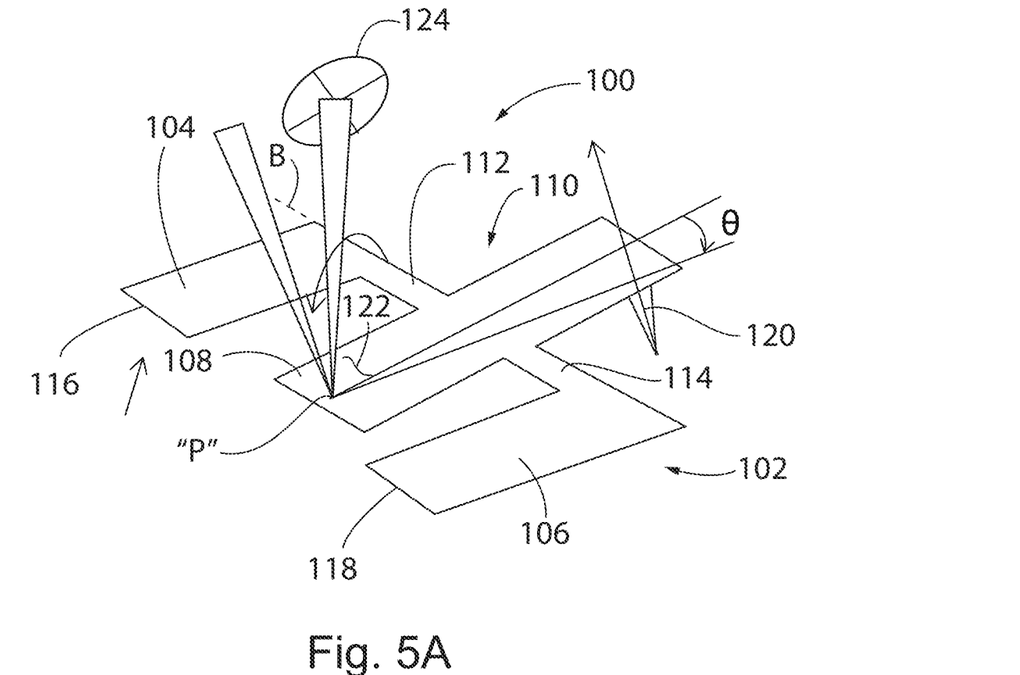
FIGS. 5A-5B show the probe of FIG. 4, illustrating that the deflection are a series of images of the stepwise microfabrication of AFM probes with large radius tips, according to a method of the preferred embodiments.
Figure 5B:
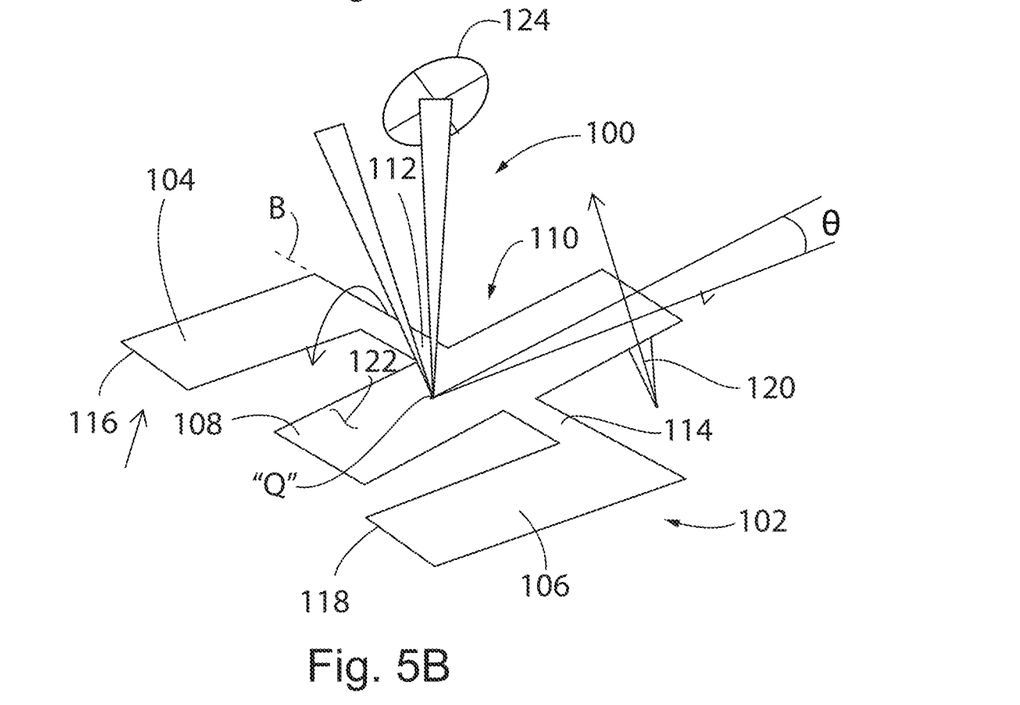

Another key benefit of torsion wing probe 100 is illustrated in FIGS. 5A and 5B. With probe 100, no matter where the laser "L" of the optical detection apparatus strikes the backside 122 of cantilever 110, position "P" (FIG. 5A) or position "Q" toward the middle of cantilever 110 (FIG. 5B), the rotation angle θ, as the beam is reflected back toward a detector 124, is the same. As a result, deflection sensitivity is the same. In the contrasting case of a typical AFM probe shown in FIGS. 2A and 2B, the deflection sensitivity changes, with the possibility that the reflected beam does not even contact the detector depending on laser source, detector positioning.

Figure 6:
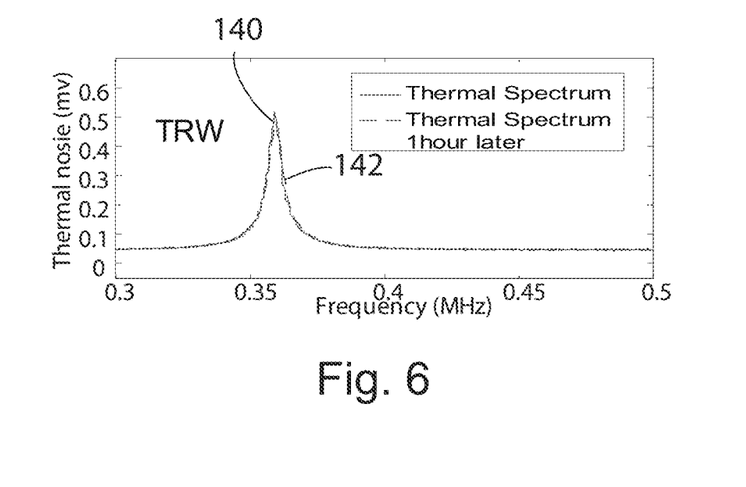
FIG. 6 is a graph illustrating low drift of a torsion wing probe of the preferred embodiments.
Figure 7:
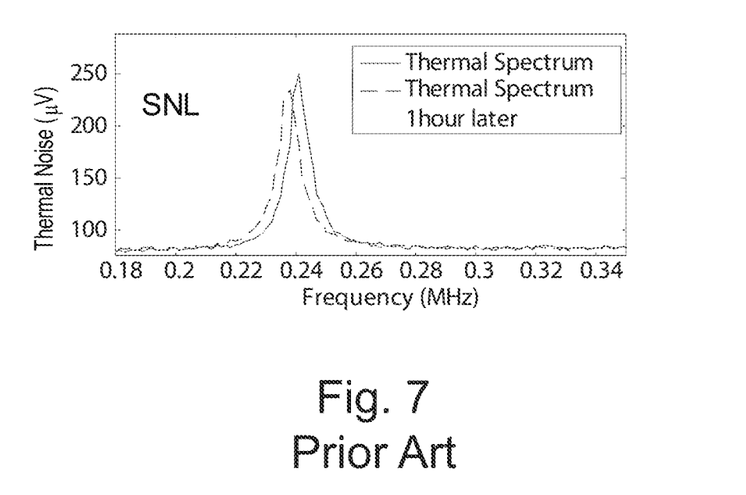
FIG. 7 is a graph similar to FIG. 6, for a conventional Prior Art diving board AFM probe.

With particular reference to PF-IR mode, the boundary condition of a conventional diving board probe having a cantilever fixed at one end impacts contact resonance measurements in a still further way. FIGS. 6 and 7 show plots of thermal noise power spectrum versus contact resonance frequency after about an hour. In FIG. 6, data associated with the torsional (TRW) probe illustrates the contact resonance steady at about 360 kHz in plot 140 (start of measurement) and plot 142 (measurement 1 hour later), with drift maintained at less than 0.3 kHz. In the case of a standard probe (SNL), drift is at least an order of magnitude greater (FIG. 7). In other words, when the cantilever is allowed to freely rotate (FIG. 6) as is the case with the torsion wing probe, contact resonance drift effects on the probe are greatly reduced as the whole probe is subject to thermal drift.

Moreover, the TRW design substantially reduces contact stiffness and lever length (for AFM operation with greater bandwidth), and improves sensitivity by more than 3λ. The lever assembly operates PFT mode in the same way as a normal rectangular diving board type lever at about 2 kHz. During transient contact of the PFT operated probe on the sample surface (excited with IR radiation), the photothermal induced surface displacement will drive the torsion bar to resonance (about 200 kHz by design) through the tip. Sensitivity is proportional to $1/k_T$ and $1/L_T$, where $k_T$ is about $1/10 k_C$, (spring constants of the torsion bar (two torsion arms that couple the cantilever to the support structure), and cantilever, respectively) and $L_T$ is about $1/3$ of L (lengths of the torsion bar and cantilever, respectively). Sensitivity can be improved by a factor of 10.

Figure 13A:
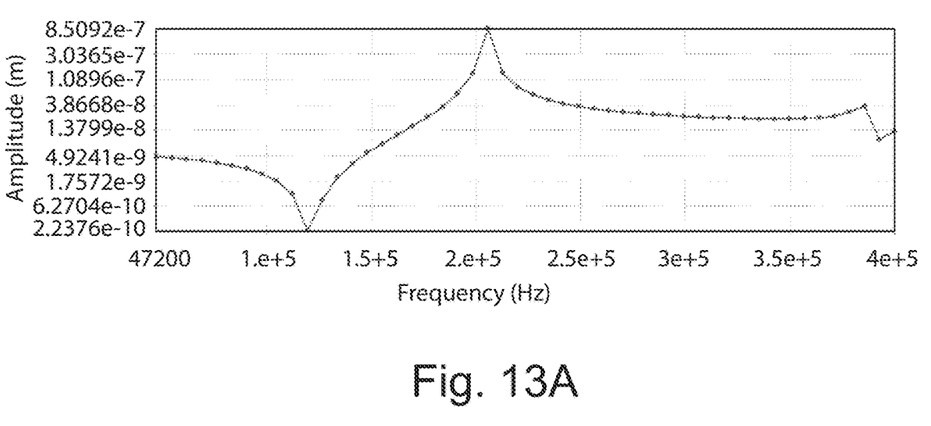
FIGS. 13A and 13B are graphs illustrating amplitude and phase versus frequency, respectively, of the oscillation of a torsion wing probe according to a preferred embodiment.
Figure 13B:
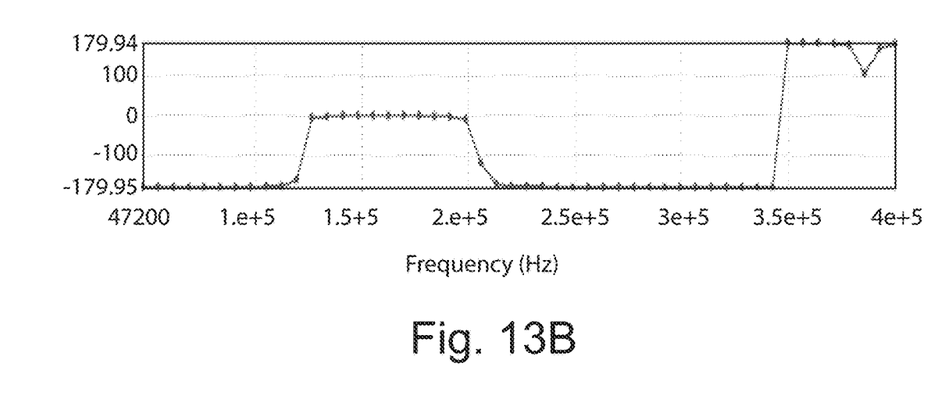

Referring to FIGS. 13A and 13B, using finite element analysis (FEA) of an oscillating TRW probe according to the preferred embodiments, it was determined that there was a torsional resonance harmonic around 210 kHz (amplitude plot in FIG. 13A, phase in FIG. 13B). This small torsional probe resonance probe has a higher "Q" ($Q=f_r/BW$) and a higher contact resonance frequency, which is especially useful for NanoIR applications (see, e.g., US Publ. No. US-2018-0052186-A1, assigned to the present assignee). In particular, the TRW probes exhibit higher deflection sensitivity and thus are able to sense the NanoIR induce surface vibration with 2~3× higher signal-to-noise ratio (S/N) than when using a conventional AFM probe.

Figure 8:
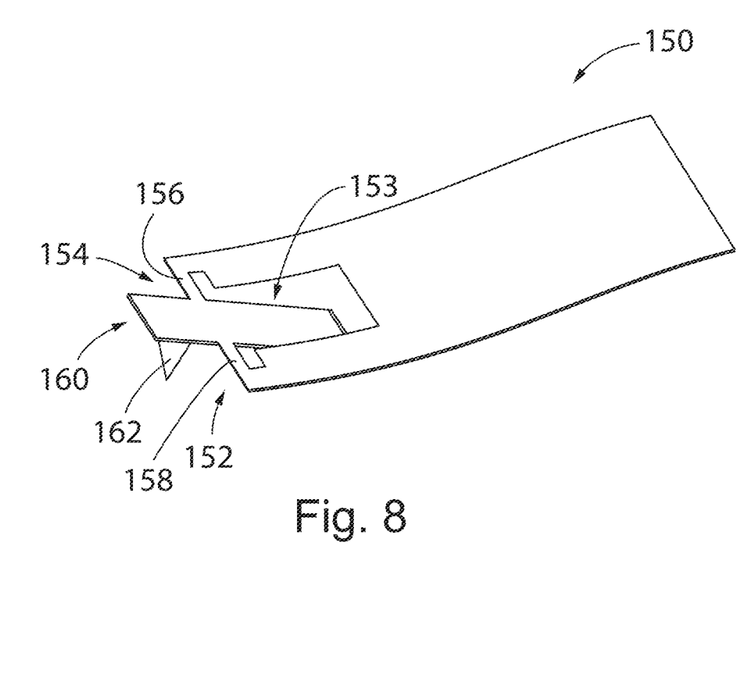
FIG. 8 is a schematic isometric view of a torsion wing probe of a preferred embodiment, shown in deflection.

Turning next to FIG. 8, an exemplary torsional (TRW) probe 150 is shown microfabricated for use in an AFM. Probe 150 includes a support structure 152 having an essentially T-shaped opening 153 defining space for a cantilever 154 to freely rotate relative to structure 152. Cantilever 154 is coupled to support structure 152 by way of co-linear torsion bars 156, 158 extending substantially orthogonally to the longitudinal axis of cantilever 154. At its free end 160, probe supports a tip 162 that moves in "Z" (substantially orthogonal to the surface of a sample (not shown) under test. As described further below, probe 150 is microfabricated so support structure 152, cantilever 154 and torsion bars 156, 158 all have the same thickness.

Probe 150 may be driven in to oscillation in a variety of modes as described earlier. In Peak Force Tapping mode (for performing, for example, PF-IR spectroscopy), a Z piezo tube to which the probe mount (not shown) supporting probe 150 is attached is driven in Z to move the probe straight up and down relative to the sample surface. Because of its size, support structure 152 is relatively stiff compared to torsion bars 156, 158 which twist/rotate to move the cantilever in "Z" and oscillate tip 162 orthogonally to the sample surface, typically at the cantilever's resonance frequency. In tapping mode, a separate Z-piezo may be provided to oscillate the probe in "Z."

Figure 9:
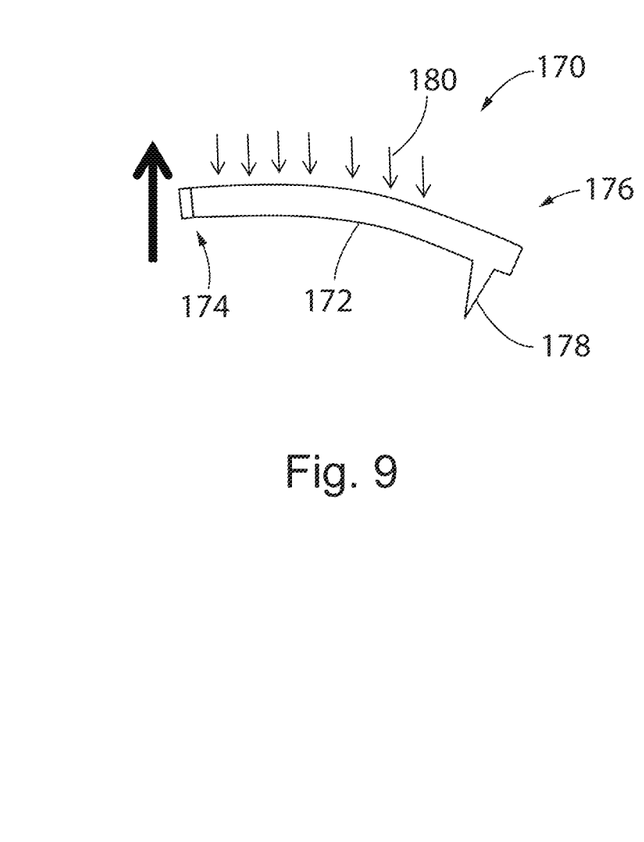
FIG. 9 is a schematic side elevational view of a Prior Art diving board type probe, operated in fluid.
Figure 10:
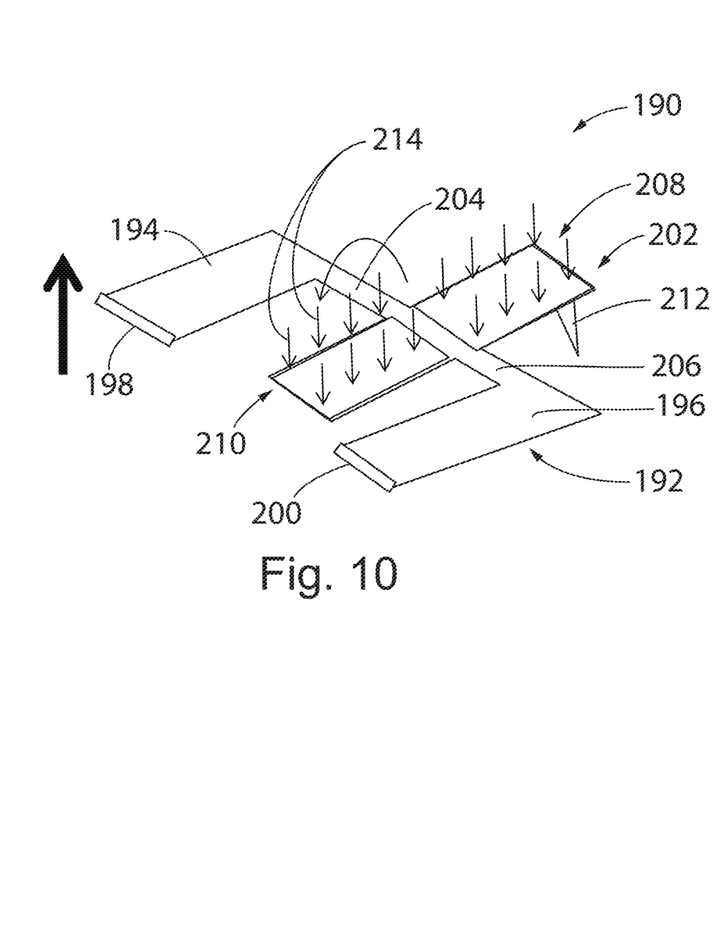
FIG. 10 is a schematic side elevational view of a torsion wing probe according to the preferred embodiments, operated in fluid.

One other key influence on AFM performance, especially as speed and resolution improvements continue to be made, is the hydrodynamic background contributions to probe deflection, particularly when experiments are performed in liquid using Peak Force Tapping mode. These are contributions to probe deflection that become part of the measured probe response, potentially contaminating the acquired data, as discussed in further detail in U.S. Pat. Nos. 8,739,309, 8,646,109, and 8,650,660. Referring to FIGS. 9 and 10 an advantage of the present TRW probe in this regard is illustrated. FIG. 9 schematically shows a conventional AFM probe 170 having a cantilever 172 with a fixed end 174 and a free end 176 supporting a tip 178. Fixed end 174 extends from a base (not shown) which is moved in Z (orthogonally to the sample surface) during AFM operation. The series of downward arrows 180 illustrate water pressure or force as the base is moved vertically upwardly. The resultant torque on probe 170 creates a hydrodynamic background contribution to probe deflection. Unless the background deflection is accounted for (typically via complex background subtraction algorithm) it may contaminate the measurement.

In contrast, referring to FIG. 10, showing a TRW probe 190 of the preferred embodiments, the hydrodynamic background effect on probe deflection is essentially zero. Probe 190 includes a support structure 192, having stiff first and second members 194, 196 with fixed ends 198, 200 coupled to a base (not shown) that moves the probe in Z, or vertically (using, for example, a z-piezo actuator or the scanning tube of an AFM). Probe also includes a cantilever 202 coupled to first and second members 194, 196 via torsion bars 204, 206. Cantilever includes a front portion 208 and a back portion 210, with front portion supporting a tip 212. Importantly, front and back portions 208, 210 preferably have substantially the same surface area. In operation, as probe 190 is driven, a torque rotates torsion bars to cause the cantilever to rotate about torsion bars 204, 206, thereby moving tip 212 orthogonally to the sample surface (not shown). Water pressure in this case is shown by the array of arrows 214 which apply a downward force on cantilever 202 when the base of the probe is moved upwardly. However, unlike probe 170, TRW probe 190 experiences zero torque, as long as the surface area of front and back portions 208, 210 is substantially the same. As a result, in the measurement data, the hydrodynamic background effect on probe deflection is effectively minimized.

Figure 11:
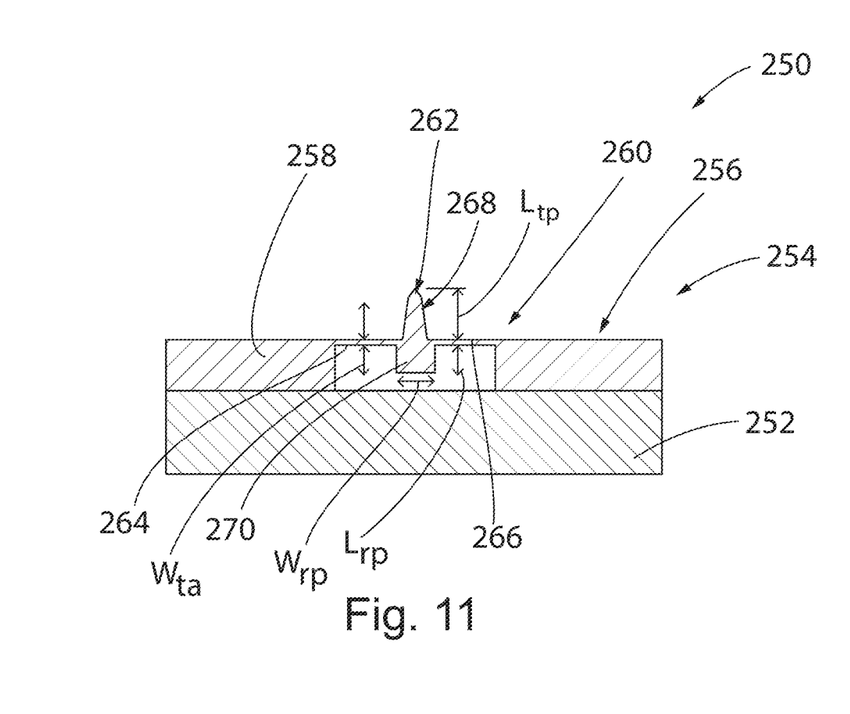
FIG. 11 is a schematic top plan view of a torsion wing probe fabricated according a preferred embodiment.
Figure 12:
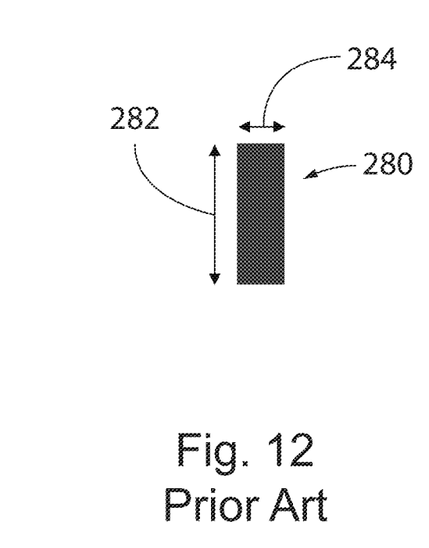
FIG. 12 is a schematic top plan view of a conventional Prior Art diving board probe.

The structure of one embodiment of a TRW probe assembly 250 according to the preferred embodiments is illustrated in top plan view in FIG. 11. Probe assembly 250 includes a base 252 from which extends a probe 254. Probe 254 includes a support structure 256 having opposed first and second portions 258, 260. Portions 258, 260 are much stiffer relative to the torsion bar arm, typically 10-20 times more stiff. Probe 252 also includes a cantilever arm 262 coupled to first and second portions 258, 260 via torsion bar arms 264, 266, as described previously. Cantilever 262 includes a front portion or tip pad 268 and a back portion or reflex pad 270. In one preferred embodiment, torsion arm width $w_{ta}$ (both arms 264, 266) is about 3.5 μm, length $l_{tp}$ of the tip 268 is about 23.5 μm, and the width $w_{rp}$ of the reflex pad 270 is about 12 μm. The resonant frequency of the probe is about 380 kHz, and the spring constant, k, is about 0.3 N/m, yielding a frequency ($f_0$)/k of about 1267. In contrast, for a standard rectangular AFM probe 280 (FIG. 12) with the same thickness, the cantilever may have a thickness of about 600 nm, a length 282 of about 77 μm and a width 284 of about 12 μm. These parameters yield a resonant frequency of about 138 kHz, a spring constant, k, of about 0.3 N/m and a frequency ($f_0$)/k of about 260. In general, however, the thickness may be as great as about 5 μm, and typically is 50 nm to 5 μm, and preferably about 750 nm.

As a result, the torsion wing probe of the preferred embodiments sees about a 3× higher $f_0$/k (natural resonant frequency to spring constant) than a standard diving board cantilever. For comparison, this torsion wing probe assembly 250 includes a cantilever having the same thickness and width as the rectangular probe to allow it to hold the same laser spot. But the higher $f_0$/k ratio allows a higher imaging bandwidth in Tapping Mode with the same imaging force.

Figure 14:
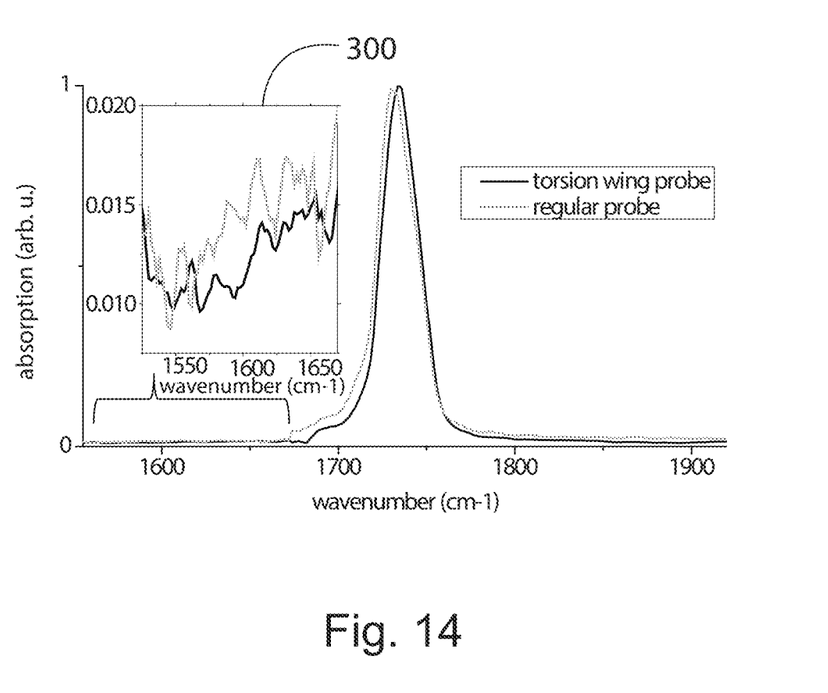
FIG. 14 is graph of NanoIR spectrum (absorption versus wavelength) of a PMMA sample imaged using a torsion wing probe of the preferred embodiments.

For instance, FIG. 14 illustrates a NanoIR spectrum of a PMMA sample obtained by an AFM employing both a torsion wing probe of the preferred embodiments, and a conventional diving board type probe. Torsion wing probes of the preferred embodiments have up to 2× better signal to noise ratio as seen from the inset 300, in the ~1550-1650 cm-1 range.

Figure 15:
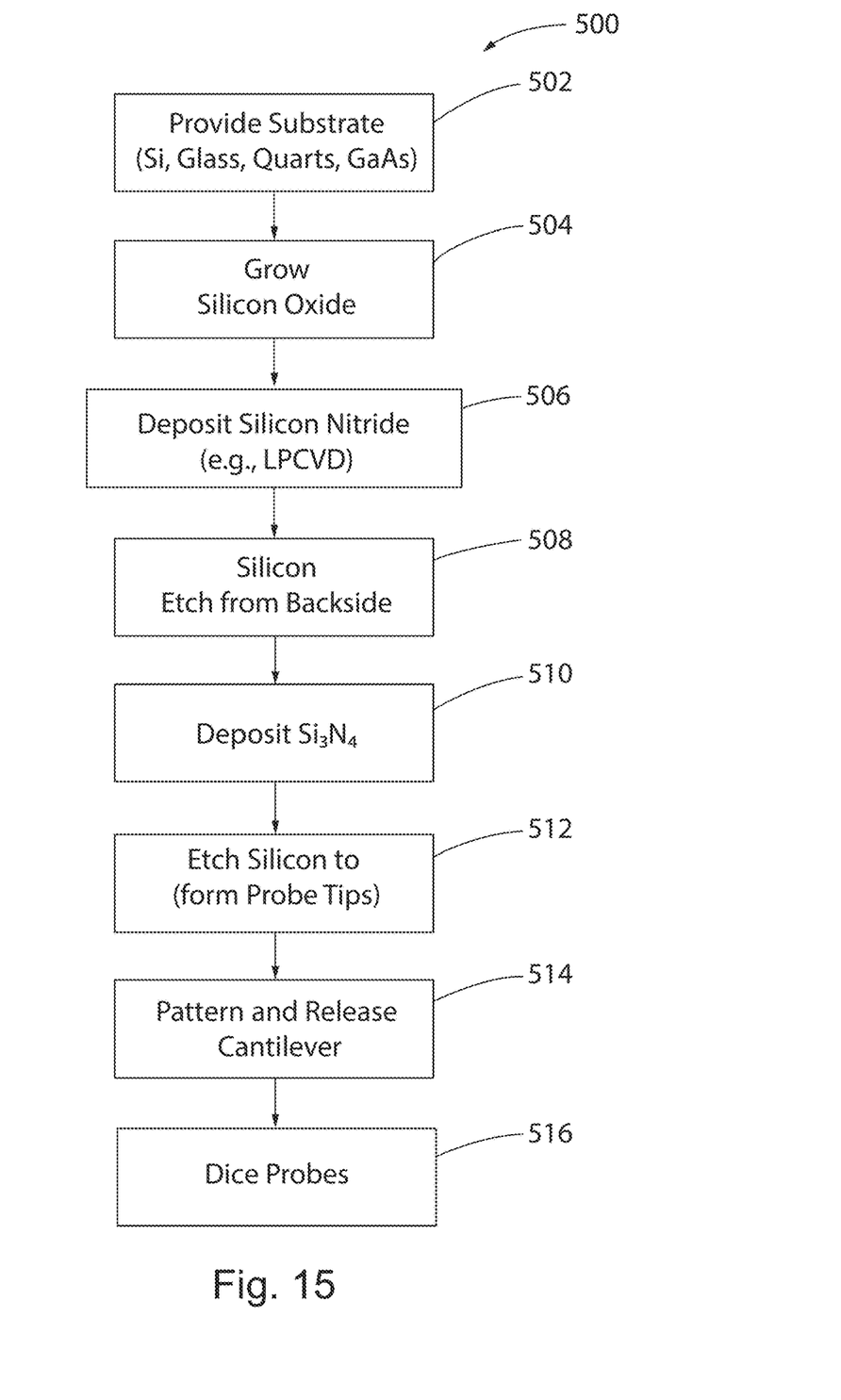
FIG. 15 is flow chart of a method of fabricating a torsion wing probe according to a preferred embodiment.
Figure 16A:
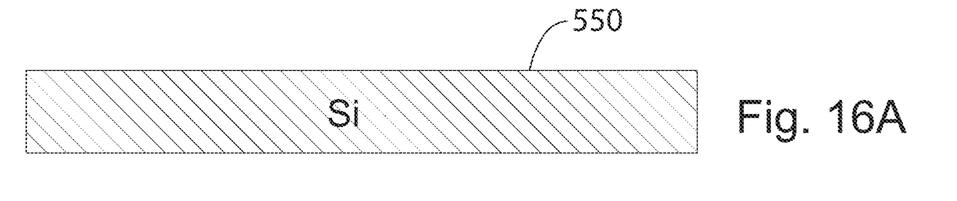
FIGS. 16A-16F are a series of schematic side elevational views of a torsion wing probe being fabricated according to preferred embodiment.

FIG. 15 illustrates a method of fabricating a torsion wing probe according to the preferred embodiments, such as those shown in FIGS. 4, 5, 8, 10 and 11 is shown. Method 500 will be described in conjunction with FIGS. 16A-16F to illustrate the probe build, as well as FIG. 17, a top plan view of an exemplary TRW probe. Method 500 includes a first step, Block 502, of providing a substrate, a silicon wafer, for example (550 in FIG. 16A). Alternate substrates may be Glass, Quartz, GaAs (Gallium Arsenide).

Figure 16B:
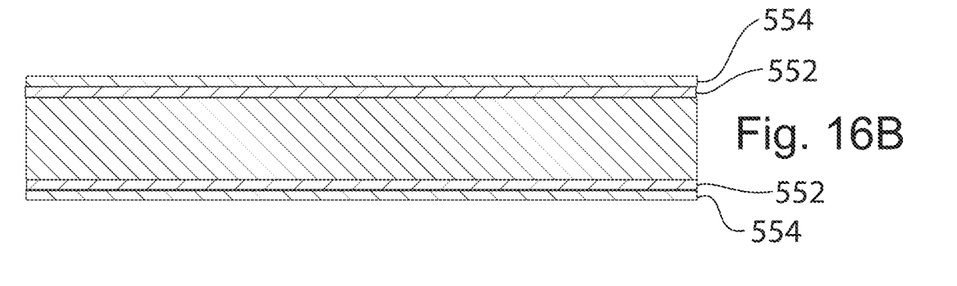
Figure 16C:
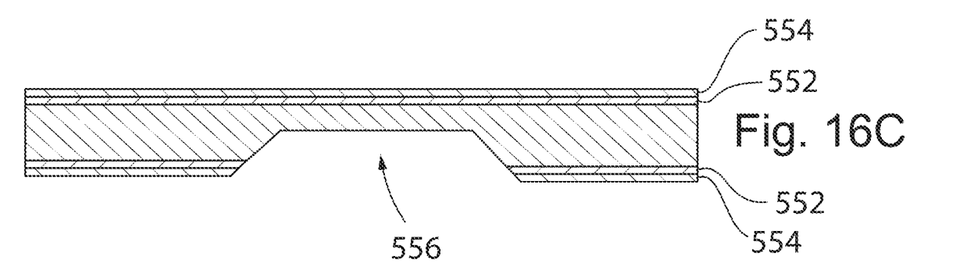
Figure 16D:
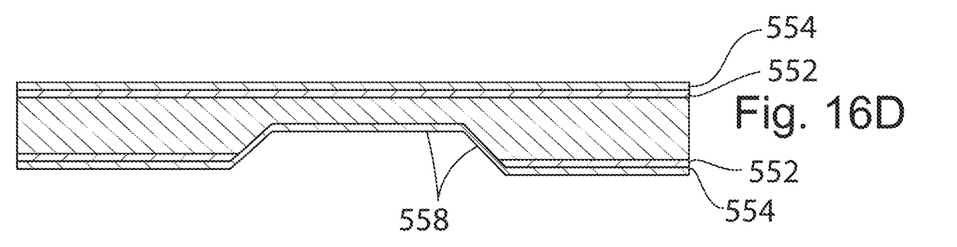
Figure 16E:
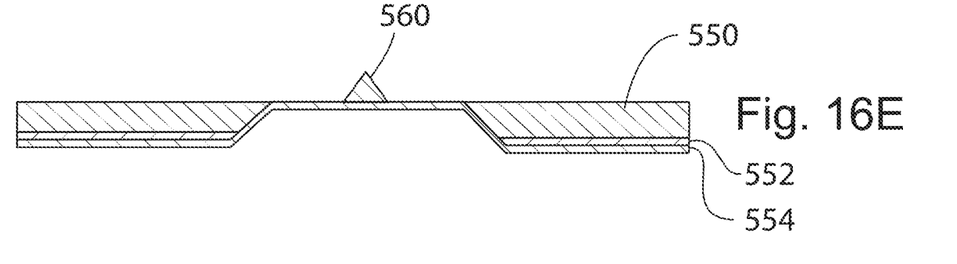

The wafer is used as a substrate for growing silicon oxide ($SiO_2$) on both sides of the wafer in Block 504. This oxide 552 is illustrated in FIG. 16B. Then, in Block 506, silicon nitride (554 in FIG. 16B) is deposited on oxide layer 552. Preferably this is done with low pressure chemical vapor deposition (LPCVD). Then an appropriate mask is used to create structures (not shown) for a subsequent etch (e.g., KOH) of the backside to define the probe bodies (base fixed end of the cantilevers) in Block 508 (see also, region 556 in FIG. 16C). More particularly, in reference to FIG. 17, this step defines at least part of a base 602 of a probe assembly 600. Next, in Block 510, a cantilever/support structure material is deposited, preferably silicon nitride ($Si_3N_4$) 558, as shown in FIG. 16D. In Block 512, the silicon is etched from the front side to form probe tips 560 of FIG. 16E (tip 616 of probe 600 in FIG. 17).

Figure 16F:
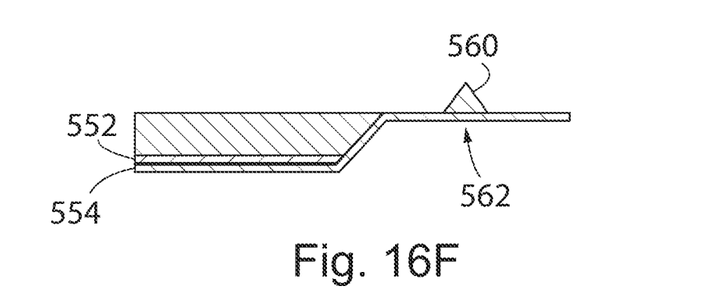
Figure 17:
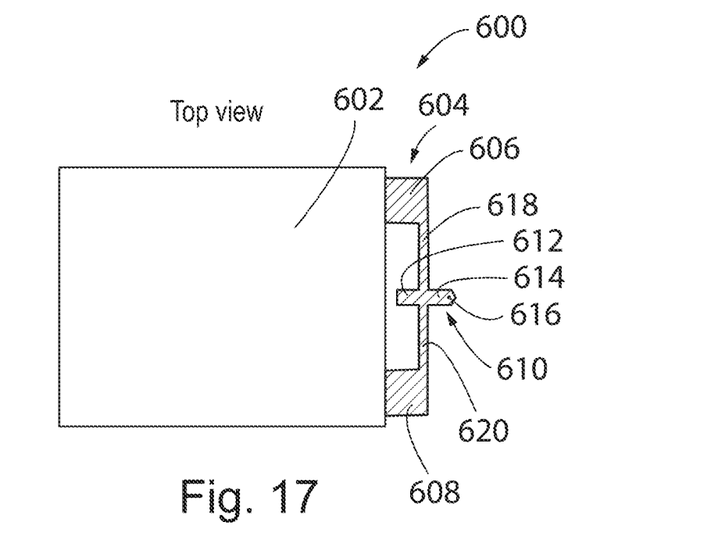
FIG. 17 is a schematic top plan view of a torsion wing probe fabricated according to the method of FIGS. 16A-16F.

Then in Block 514, cantilevers 562 (FIG. 16F) are photolithographically patterned and formed via an appropriate etch. With reference to FIG. 17, this step defines support structure 604 including support members 606, 608 and torsion arms 618, 620 which couple support structure 604 and a cantilever 610. Cantilever includes a rear portion 612 and a front portion 614 supporting a tip 616. Similar to the schematic view of FIG. 10, rear and front portions 612, 614 preferably have similar size so when operated in fluid the fluid force (arrows 204—FIG. 10) on the cantilever is the essentially the same on both portions.

Finally, the probes are diced are otherwise released from the wafer in Block 516 to form probes such as that shown in FIG. 17. Typical dimensions for optimum performance include those disclosed in connection with FIG. 11.

Although certain embodiments contemplated by the inventors of carrying out the present invention are disclosed above, practice of the present invention is not limited thereto. It will be manifest that various additions, modifications and rearrangements of the features of the present invention may be made without deviating from the spirit and scope of the underlying inventive concept.

We claim:

1. A method of operating an AFM to measure photothermal induced surface displacement of a sample, the method comprising the steps of:
   providing a torsion wing probe having a support structure, a cantilever supporting a tip and a torsion bar including torsion arms coupling the cantilever to the support structure;
   driving the probe in to oscillation in an AFM mode of operation;
   directing IR radiation toward a surface of the sample at about a location of the tip causing displacement of the surface and driving the torsion bar in to resonance; and
   measuring the displacement based on deflection of the probe in response to the directing step.

2. The method of claim 1, wherein the AFM mode is PFT mode.

3. The method of claim 1, wherein the torsion wing probe has a homogeneous thickness.

4. The method of claim 1, wherein the IR radiation is mid-IR radiation.

5. The method of claim 1, wherein the cantilever includes first and second portions on opposites sides of the torsion arms, wherein the surface area of the first portion is substantially equal to the surface area of the second portion, and wherein a resonant frequency of the torsion wing probe is between about 300-500 kHz, and the spring constant, k, is between about 0.1 and 0.5 N/m.

6. The method of claim 1, wherein the support structure, the cantilever and the torsion arms have substantially the same thickness.

7. The method of claim 6, wherein the thickness is less than 5 μm.

8. The method of claim 1, wherein a ratio of natural resonance frequency to spring constant ($f_0/k$) of the probe is at least three (3) times greater than the $f_0/k$ of a diving board cantilever having one end fixed to a diving board base, a resonant frequency of about 138 kHz, and a spring constant, k, of about 0.3 N/m.

9. The probe of claim 1, wherein a stiffness of the support structure is at least ten times greater than the stiffness of the torsion arms.

10. The probe of claim 1, wherein the support structure and cantilever are silicon nitride.

* * * * *